(12) United States Patent
Kowalski et al.

(10) Patent No.: US 10,479,226 B2
(45) Date of Patent: Nov. 19, 2019

(54) MANAGEMENT OF MOBILE DEVICE CONTROL OF VEHICLE SYSTEMS USING POLICIES

(71) Applicant: Ford Global Technologies, LLC, Dearborn, MI (US)

(72) Inventors: David Allen Kowalski, Toledo, OH (US); Oleg Yurievitch Gusikhin, Commerce Township, MI (US); Omar Makke, Lyon Township, MI (US); Perry Robinson MacNeille, Lathrup Village, MI (US); Elizabeth Halash, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 15/264,143

(22) Filed: Sep. 13, 2016

(65) Prior Publication Data

US 2018/0072190 A1  Mar. 15, 2018

(51) Int. Cl.
*B60N 2/02* (2006.01)
*H04W 12/08* (2009.01)
*H04W 4/44* (2018.01)
*H04W 12/06* (2009.01)

(52) U.S. Cl.
CPC ............ *B60N 2/0244* (2013.01); *H04W 4/44* (2018.02); *H04W 12/08* (2013.01); *H04W 12/06* (2013.01)

(58) Field of Classification Search
CPC ...... B60N 2/0244; H04W 12/06; H04W 4/44; H04W 12/08
See application file for complete search history.

(56) References Cited

U.S. PATENT DOCUMENTS

| 2009/0316673 | A1* | 12/2009 | Yagley | H04W 12/06 370/338 |
| 2011/0009107 | A1* | 1/2011 | Guba | G08G 1/20 455/418 |
| 2013/0217331 | A1* | 8/2013 | Manente | H04W 4/008 455/41.2 |
| 2014/0019401 | A1* | 1/2014 | Boyer | B60K 35/00 706/47 |
| 2014/0200765 | A1* | 7/2014 | Waeller | H04L 12/282 701/36 |
| 2014/0310739 | A1* | 10/2014 | Ricci | H04W 48/04 725/28 |
| 2014/0335902 | A1 | 11/2014 | Guba et al. | |

(Continued)

FOREIGN PATENT DOCUMENTS

| WO | WO-2004074047 A1 * | 9/2004 | ........... B60N 2/0244 |
| WO | 2015108706 A1 | 7/2015 | |

*Primary Examiner* — Rodney A Butler
(74) *Attorney, Agent, or Firm* — Michael J. Spenner; Brooks Kushman P.C.

(57) ABSTRACT

Systems and methods for managing mobile device control of vehicle functions and subsystems using policy control are disclosed. A computing platform of a vehicle may receive a request, from a mobile application, to access one or more secure vehicle functions and subsystems. The computing platform may retrieve application permissions for the mobile application from a policy table to determine whether to allow the requested access, deny the requested access or to prompt a driver for permission to allow access to the secure vehicle function.

20 Claims, 3 Drawing Sheets

(56) References Cited

U.S. PATENT DOCUMENTS

| | | | |
|---|---|---|---|
| 2015/0105944 A1* | 4/2015 | Louboutin | H04W 4/021 |
| | | | 701/2 |
| 2017/0034766 A1* | 2/2017 | Christ | B60K 28/00 |
| 2017/0111798 A1* | 4/2017 | Dieckmann | H04L 63/107 |

* cited by examiner

US 10,479,226 B2

MANAGEMENT OF MOBILE DEVICE CONTROL OF VEHICLE SYSTEMS USING POLICIES

TECHNICAL FIELD

This disclosure generally relates to managing mobile device control of vehicle systems using policies.

BACKGROUND

A vehicle may allow for the integration of multiple mobile devices for controlling vehicle functions and subsystems. However, a contextual problem may arise in managing the actual transfer of control between multiple devices while maintaining the overall safety of all vehicle occupants under a variety of automobile dynamic conditions. Such problems include determining who is in control and how that changes. And if a passenger is permitted to gain control, how is that made possible and accomplished safely? Accordingly, there exists a need to provide efficient systems and methods for managing mobile device control of vehicle systems that mitigate those risks in a central and effective manner.

SUMMARY

In a first illustrative embodiment, a system includes a computing platform of a vehicle programmed to receive a request, from a mobile device executing a mobile application, to access a secure vehicle function and retrieve a vehicle seat location associated with a user of the mobile device. The computing platform is also programmed to query a local policy table for application permissions associated with the secure vehicle function and the vehicle seat location. The application permissions define which vehicle functions are accessible to the mobile application based on the vehicle seat location. The computing platform may be further programmed to provide the mobile application access to the secure vehicle function in accordance with the application permissions. The secure vehicle function may include vehicle climate control, vehicle navigation control, vehicle radio control, and/or vehicle seat control. The computing platform is further programmed to request driver permission responsive to a determination based on the local policy table that access to the secure vehicle function requires authorization by a driver of the vehicle.

In a second illustrative embodiment, a system includes a mobile device, connected to a computing platform of a vehicle, programmed to execute a mobile application to access a vehicle subsystem and prompt a user to input a vehicle seat location. The mobile device is also programmed to send to the computing platform a policy table update received from a remote server including a local policy table with application permissions defining which functions of the vehicle are accessible to the mobile application based on the vehicle seat location. The mobile device may be further programmed to display an approved indicator responsive to the computing platform granting the mobile application access to the vehicle subsystem and display a denied indicator responsive to the computing platform denying the mobile application access to the vehicle subsystem. The mobile device may be further programmed to display a selection of vehicle subsystems available for passenger control and to prompt a user to select the vehicle subsystem to control.

In a third illustrative embodiment, a computer-implemented method for a vehicle includes receiving a request from a mobile device executing a mobile application to access a vehicle subsystem and retrieving a vehicle seat location associated with the mobile device from the mobile application. The method also includes querying a local policy table to determine application permissions associated with the vehicle subsystem and the vehicle seat location. The method then provides the mobile application access to the vehicle subsystem in accordance with the application permissions. The method may further include updating the local policy table based on policy table updates issued from a remote server.

DETAILED DESCRIPTION

Figure 1:
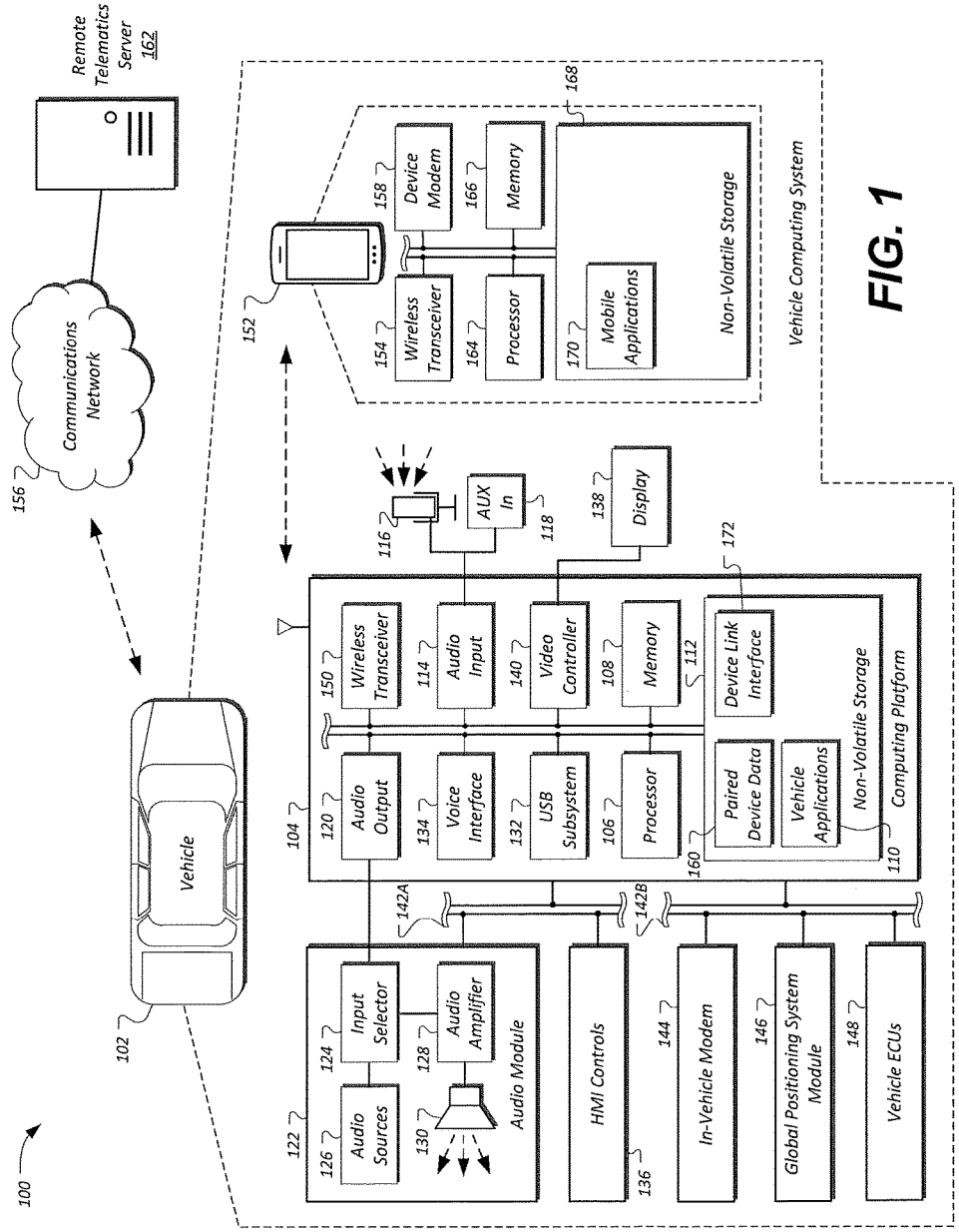
FIG. 1 illustrates an example diagram of a system configured to provide telematics services to a vehicle according to embodiments of this disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A mobile application executed by a mobile device connected to a vehicle may request access to one or more secure vehicle functions and subsystems. Examples of secure vehicle functions may include, but is not limited to, access to a vehicle radio system, climate control system, navigation system, seat system, audio system, and sunroof system. In an example, the user may execute the application on a cellular phone, where the application requests permission to control the radio and if permission is granted, the available radio stations and settings are displayed to the user on the mobile device. Likewise, if the system determines that driver permission is required to pass control to the user (a passenger in the vehicle), then the system asks for driver permission through the vehicle human-machine interface (HMI). If the driver grants the permission, the passenger can then proceed to change the radio settings as desired from the mobile device.

As the mobile application has access to vehicle functions and subsystems, the vehicle may authenticate the application using one or more security mechanisms. For instance, each application may be associated with an application identifier, and the vehicle may validate that the application identifier is included on a list of identifiers of applications that are allowed to communicate with the vehicle. As another possibility, each application may be associated with particular application programming interface (API) calls to which the application is authorized, and the vehicle may validate the commands the application sends to the vehicle to ensure that the application is making API calls that are indicated as being allowable.

When the application registers in-vehicle with the vehicle computing system, the application provides the application identifier to the vehicle. The vehicle computing system may then check a policy table downloaded to the vehicle computing platform from a remote server to identify an application policy associated with the provided application identifier. The application policy may dictate whether the application is allowed to access and control the associated vehicle subsystem and what restrictions and permissions apply. If the policy table file does not contain policy permissions for the application identifier, the vehicle computing system may request a policy table file update from the remote server. The updated policy table file provided by the server may include updated policy permissions and other application information.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, MI. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. The voice interface 134 may utilize probabilistic voice recognition techniques using the grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server 162 or other network services via the device modem 158. The computing platform 104 may also include a device link interface 172 to facilitate the integration of functionality of the mobile applications into the grammar of commands available via the voice interface 134. The device link interface 172 may also provide the mobile applications with access to vehicle functions and information available to the computing platform 104 via the in-vehicle networks 142. An example of a device link interface 172 may be the SYNC APPLINK component of the SYNC system provided by The Ford Motor Company of Dearborn, Mich.

Figure 2:
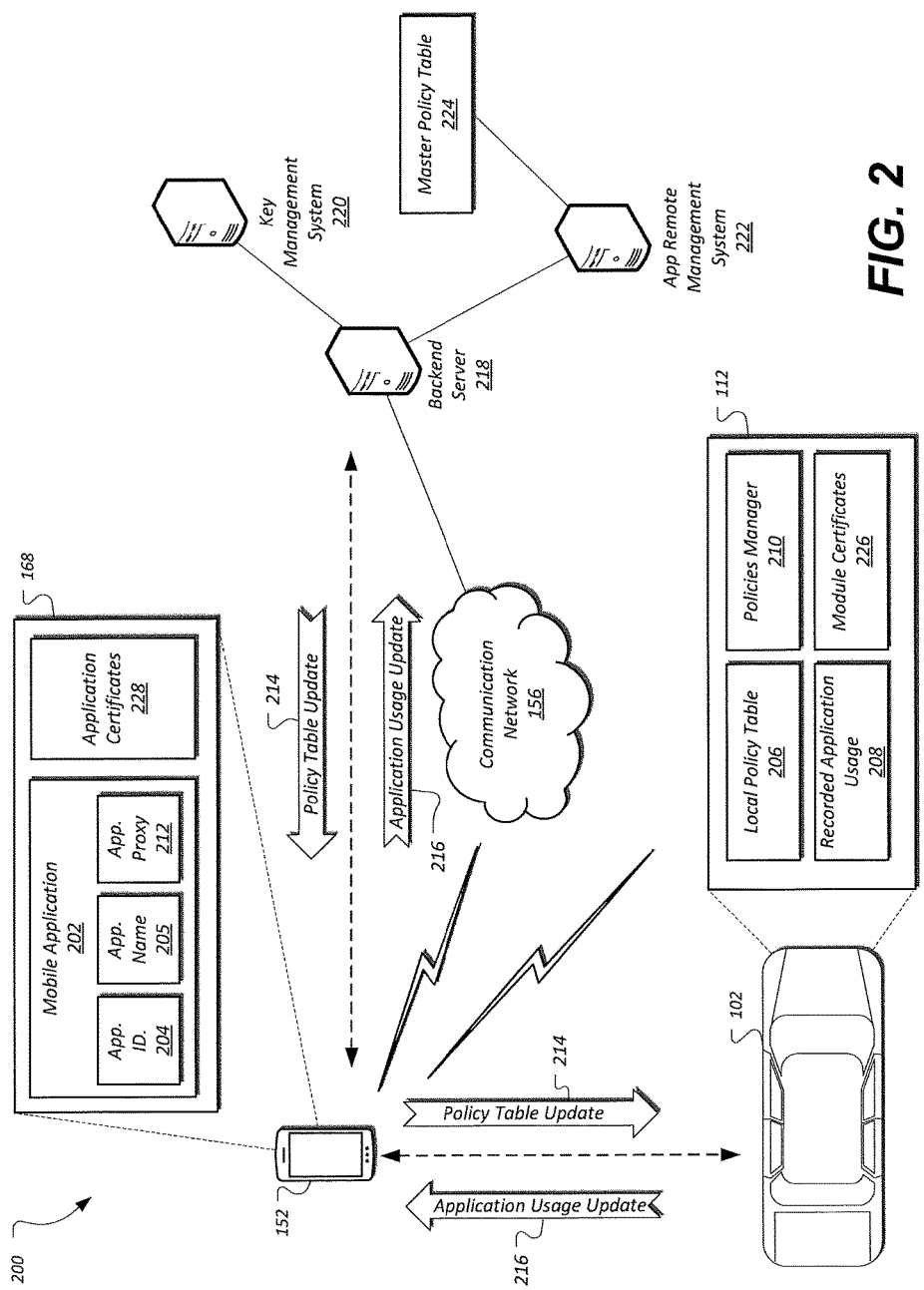
FIG. 2 illustrates an example diagram of an application policies architecture according to embodiments of this disclosure.

FIG. 2 illustrates an example diagram of an application policies architecture 200. As illustrated, the architecture 200 includes a vehicle 102 having a policies manager 210 in communication with a backend server 218 via the communications network 156. The policies manager 210 may be configured to maintain a local policy table 206 and recorded application usage 208. The mobile device 152 may execute a mobile application 202 associated with an application identifier 204 and including an application proxy 212 facilitating communication with the backend server 218 by way of the communications network 156. The backend server 218 may be configured to provide access to a key management system 220 and an application remote management system 222 maintaining a master policy table 224. As explained in detail below, the remote management system 222 may be configured to provide policy table updates 214 to the vehicle 102 via the application proxy 212 of the mobile device 152.

The mobile application 202 may be an application installed to the mobile device 152 for use with the computing platform 104 of the vehicle 102. According to embodiments of the present disclosure, the mobile application 202 may request access to one or more secure vehicle functions and subsystems. In an example, the mobile application 202 may request access to the vehicle's climate control system to allow a passenger to adjust heating and/or cooling within the vehicle 102. In this case, driver permission to transfer control may or may not be necessary. If a passenger zone control is equipped in the passenger seating location (seating location associated with the mobile device), the system automatically allows the mobile application's access request and the passenger can proceed to make the desired control adjustments from the mobile device. However, if passenger zone control is not available in the passenger seating location, then the system will prompt the driver via the HMI for authorization to transfer control to the passenger. As some other possibilities, the mobile application 202 may further provide for access to a vehicle's navigation, radio and audio systems.

The local policy table 206 may be configured to store key information detailing application permissions in the vehicle 102. Application permissions may include information about what vehicle subsystems are accessible to vehicle occupants, when driver permission is required to transfer control to a non-primary mobile device and when to terminate access to the vehicle subsystem and return control to a driver. Thus, the local policy table 206 may define the type of interaction that is allowed between the computing platform 104 and a given mobile application 202.

The permission information may include, for example, a listing of vehicle systems that are deemed allowable for use by the mobile application 202. The local policy table 206 may also include permission information based on the vehicle seating location associated with the mobile device. For example, if the mobile device is a non-primary device, the application permissions may include information about what vehicle functions and subsystems can be accessed without first prompting a driver for permission. This may be dependent on whether local/passenger zone control is equipped in the vehicle seating location associated with the mobile device. For instance, application permission for allowing a passenger to adjust the vehicle air conditioning may be dependent on whether local A/C controls are equipped in the passenger seating location. Similarly, application permissions may be keyed to automatically permit rear seat vehicle occupants access to rear infotainment systems without prompting a driver for permission. The local policy table 206 may further include information regarding how and when the vehicle 102 requests updates to the local policy table 206, as well as information regarding how to contact a source of updated local policy tables 206 (e.g., a URL or other address of the backend server 218).

The recorded application usage 208 may include logged usage of the API and vehicle 102 system usages, or other vehicle functions whose permission is controlled for the mobile application 202. Thus, the recorded application usage 208 may include collected usage data regarding how users are using the mobile application 202 in the vehicle 102.

The policies manager 210 may be configured to manage mobile application 202 permissions for the computing platform 104 of the vehicle 102. In an example, the policies manager 210 may maintain the local policy table 206. When a mobile application 202 is initiated or activated, the policies manager 210 may identify the permissions associated with the mobile application 202 based on the local policy table 206. Moreover, when the mobile application 202 interacts with the computing platform 104, the policies manager 210 may record the mobile application 202 usage of vehicle APIs and vehicle 102 systems in the recorded application usage 208.

The policies manager 210 of the computing platform 104 may be further configured to manage communication to the backend server 218. In terms of requests or responses between the policies manager 210 and the backend server 218, the policies manager 210 may be configured to initiate communications to the backend server 218. In an example, the policies manager 210 may provide a message to the backend server 218 to inform the backend server 218 that the vehicle 102 is on and listening for information. In some cases, the backend server 218 may address an unsolicited message to a specific vehicle 102 and push it to the cloud. However, the message may not be delivered to the vehicle 102 until the computing platform 104 connects and requests it from the backend server 218.

The policies manager 210 may be configured to request the backend server 218 to provide the vehicle 102 with updates to the local policy table 206. The policy table updates 214 may include, for example, a new local policy table 206 to replace the local policy table 206 currently stored by the policies manager 210, or updates to an existing local policy table 206 to augment the current entries of the local policy table 206. The policy table update 214 may be based on the latest information maintained by the application remote management system 222 in a master policy table 224 of the latest mobile application 202 permissions. For instance, the policies manager 210 may request an update to the local policy table 206 if a mobile application 202 requests access to a vehicle subsystem and the local policy table 206 is missing application permission information for that subsystem or vehicle function.

The policies manager 210 may be further configured to provide the recorded application usage 208 to the backend server 218 for remote review and processing. To do so, the policies manager 210 may provide an application usage update 216 message including the recorded application usage 208 information stored by the vehicle 102. This may allow the system to verify that the mobile application 202 is utilizing the APIs and vehicle 102 systems appropriately.

The wireless transceiver 115 of the vehicle 102 may be connected to a paired mobile device 152 (e.g. via a BLUETOOTH connection, via a USB connection, etc.), such that the communications features of the mobile device 152 may be used to allow the computing platform 104 to communicate via the communications network 156 with the backend server 218. The communications network 156 may accordingly be utilized by the mobile device 152 via a cellular data plan of the mobile device 152 (e.g., to provide TCP/IP-based communications functionality to the computing platform 104). Additionally or alternately, the computing platform 104 may utilize the vehicle modem 144 to communicate data between the processor 106 and the communications network 156. Messages directed to the vehicle 102 via the communications network 156 may be queued in the cloud until a connection to the vehicle 102 can be established or until the message expires. In an example, the queuing and message expiration functionality may be implemented via the backend server 218. The communications network 156 message queuing functionality may also act as a first line of defense against server denial-of-service attacks.

Figure 3:
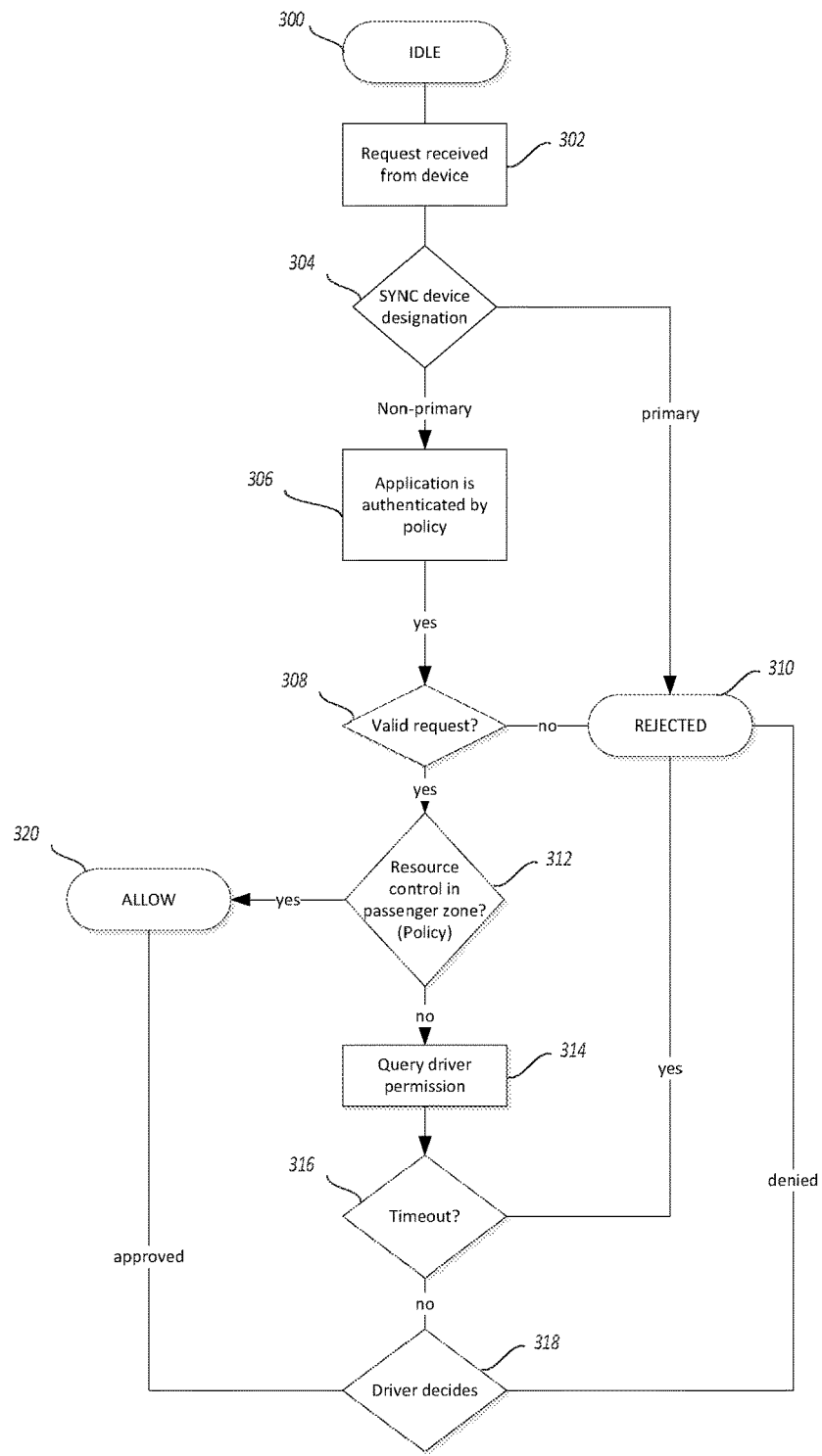
FIG. 3 illustrates an example process for using policies to manage mobile device control of vehicle functions and subsystems according to embodiments of this disclosure.

FIG. 3 illustrates an example process for using policies to manage mobile device control of vehicle functions and subsystems. The system is initially idle at 300 until a request is received at 302 from a mobile device executing a mobile application to access a vehicle subsystem. For example, the request may be to access the vehicle radio, climate, navigation or audio systems. Next, the SYNC device designation is determined at 304—namely, whether the request is from a primary mobile device (a driver of the vehicle) or a non-primary mobile device (a passenger of the vehicle including both front and rear occupants). Determination of the device designation can be made from the mobile application prompting the user to input its vehicle seating location into the mobile device. Alternately, the vehicle seating location associated with the mobile device can be determined from a sensor or other similar mechanism for ascertaining the position/location of the mobile device within the vehicle. If the device designation at 304 is primary, then the request for access is rejected or denied at 310. This illustrative method applies only to non-primary devices because when a driver uses smart device link for remote control, there are no requests. A driver is permitted to have access to all allowable vehicle subsystems. As such, this does not apply to primary devices.

If the device designation is non-primary at decision block 304, then the system authenticates the application using the local policy table 306. If an application identifier is not found in the local policy table, then the system requests a policy table update from the remote server (as discussed above with reference to FIG. 2). Once the application is authenticated using one of the security mechanisms discussed above, then the system queries the local policy table to determine if the access request is valid and allowable at decision block 308. If not, then the access request is denied at 310. If the access request is valid at decision block 308, the system then queries the policy table to determine, at decision block 312, the specific application permissions that correspond with the selected vehicle subsystem and the vehicle seating location associated with the mobile device. During this query, the system also determines from the application permissions whether the access request can be automatically approved (which reduces driver distraction) or if driver permission is required. An access request may be automatically approved if a passenger/local zone control is located in the vehicle seating position associated with the mobile device. For example, if the access request is for control of heating and/or cooling of the vehicle and there are separate passenger controls located in the seating position associated with the mobile device, then the system may be configured to automatically approve such requests, as shown at block 320. However, if there are not separate passenger controls located in the seating position, then the system queries the driver for permission via the HMI, as shown at 314. Additionally, access to some vehicle subsystems will always require driver permission, such as tuning the radio.

After requesting driver permission to transfer control of a vehicle subsystem to the mobile application associated with a non-primary device at 314, a timeout period is initiated at 316. If the driver does not respond to the driver permission query before expiration of the timeout period 316, then the mobile application's access request is denied at 310. Likewise, if the driver denies permission at 318 prior to timeout expiration at 316, then the mobile application's access request is denied at 310. In contrast, if the driver grants permission at 318 prior to timeout expiration at 316, the access request is granted at 320.

Upon granting the mobile application's access request to control the selected vehicle subsystem, the driver is notified and/or alerted to the transfer of control and the mobile application is notified that its request was granted. This approval is displayed on the mobile device to alert the user of the status change and allow for the user to control functionality associated with the selected vehicle subsystem. Access to a vehicle subsystem by the mobile application can be terminated at any time by the driver via the HMI. Additionally, access to the vehicle subsystem may be terminated by the ignition cycle, exiting the mobile application through the vehicle's interface and deselecting or disabling a remote control feature in the vehicle. Moreover, after a predetermined amount of time the mobile application itself will timeout and transfer control back to the driver.

As can be seen by the representative embodiments described herein, embodiments according to the present disclosure effectively mitigate risks associated with managing control across multiple devices within a vehicle while reducing driver distraction.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A system comprising:
a vehicle configured to, responsive to receiving a request from a mobile device associated with a particular seat location to access a secure vehicle function, request driver authorization for the mobile device to access the function based on the seat location associated with the mobile device and a query of a local policy table defining which vehicle functions accessible to the mobile device require driver authorization based on the associated seat location.

2. The system of claim 1, wherein the secure vehicle function is vehicle navigation control or radio control.

3. The system of claim 1, wherein the vehicle is further configured to:
refuse the mobile device access to the secure vehicle function responsive to failing to receive driver permission within a predetermined period of time; and
provide the mobile device access to the secure vehicle function responsive to receipt of driver permission within the predetermined period of time.

4. The system of claim 1, wherein the vehicle is further configured to refuse the mobile device access to second secure vehicle function responsive to the mobile device attempting to access the second secure vehicle function for which, according to the local policy table, the mobile device lacks permission to access the second secure vehicle function.

5. The system of claim 1, wherein the vehicle is further configured to, responsive to receiving a request from the mobile device to access a second secure vehicle function, and to identifying that the local policy table lacks permissions associated with the second secure vehicle function and the seat location associated with the mobile device, send an application message to the mobile device requesting a policy table update from a remote server.

6. The system of claim 1, wherein the vehicle is further configured to provide the mobile device access to a second secure vehicle function responsive to receiving a request from the mobile device to access the second secure vehicle function and to determining based on the local policy table that the second secure vehicle function includes passenger controls located within a vehicle passenger zone associated with the seat location.

7. The system of claim 6, wherein the vehicle is further configured to request driver permission for user access to the second secure vehicle function responsive to receiving the request from the mobile device to access the second secure vehicle function and to determining, based on the local policy table, that the passenger controls are not located in the vehicle passenger zone.

8. The system of claim 1, wherein the request from the mobile device is generated by a mobile application executing on the mobile device, and the vehicle is further configured to terminate the mobile application responsive to receiving a driver request to terminate the mobile application.

9. The system of claim 6, wherein the vehicle includes a human-machine interface, and the vehicle is configured to, responsive to the access to the second secure vehicle function being provided to the mobile device, display a driver notification on the human-machine interface indicating access has been provided to the mobile device.

10. The system of claim 1, wherein the vehicle is further configured to authenticate the mobile device based on the local policy table.

11. A system, comprising:
a mobile device, connected to a computing platform of a vehicle, programmed to
execute a mobile application to access a vehicle subsystem;
prompt a user to input a vehicle seat location; and
send to the computing platform a policy table update received from a remote server including a local policy table with application permissions defining which functions of the vehicle are accessible to the mobile application based on the vehicle seat location.

12. The system of claim 11, wherein the mobile device is further programmed to display an approved indicator responsive to the computing platform granting the mobile application access to the vehicle subsystem and display a denied indicator responsive to the computing platform denying the mobile application access to the vehicle subsystem.

13. The system of claim 11, wherein the mobile device is further programmed to display a selection of vehicle subsystems available for passenger control and to prompt the user to select the vehicle subsystem to control.

14. A computer-implemented method comprising:
by a vehicle, responsive to receiving a request from a mobile device associated with a particular seat location to access a vehicle subsystem, requesting driver authorization for the mobile device to access the vehicle subsystem based on the seat location associated with the mobile device and a query of a local policy table defining which vehicle subsystems accessible to the mobile device require driver authorization based on the associated seat location.

15. The computer-implemented method of claim 14, further comprising updating the local policy table based on policy table updates issued from a remote server.

16. The computer-implemented method of claim 14, wherein the vehicle subsystem is a vehicle audio system or a vehicle sunroof system.

17. The computer-implemented method of claim 14, further comprising automatically providing the mobile device access to a second vehicle subsystem in response to receiving a request from the mobile device to access the second vehicle subsystem based on the local policy table indicating that local control of the second vehicle subsystem is located in a passenger zone associated with the seat location associated with the mobile device.

18. The computer-implemented method of claim 14, wherein the request from the mobile device is generated by a mobile application executing on the mobile device, and further comprising terminating the mobile application in response to the vehicle being turned off or a remote control feature of the vehicle being disabled.

19. The system of claim 1, wherein the vehicle is further configured to:
log usage of the secure vehicle function by the mobile device; and
transmit the logged usage to a remote server.

20. The computer-implemented method of claim 17, further comprising, responsive to the mobile device being provided access to the second vehicle subsystem, displaying a driver notification indicating access to the second vehicle subsystem has been provided to the mobile device.

* * * * *